United States Patent [19]

Wagner et al.

[11] Patent Number: 4,760,470
[45] Date of Patent: Jul. 26, 1988

[54] MULTI-STANDARD ADAPTIVE DROPOUT COMPENSATOR

[75] Inventors: Steven D. Wagner, San Jose; Reginald W. Oldershaw, Redwood City, both of Calif.

[73] Assignee: Ampex Corporation, Redwood City, Calif.

[21] Appl. No.: 781,279

[22] Filed: Sep. 27, 1985

[51] Int. Cl.[4] .............................................. H04N 9/79
[52] U.S. Cl. .................................................... 358/314
[58] Field of Search ............... 358/314, 336, 160, 167; 360/38.1

[56] References Cited

U.S. PATENT DOCUMENTS 3,925,811 12/1975 Kenney .
3,952,326 4/1976 Rotter .
4,355,333 10/1982 Sato .
4,368,483 1/1983 Liu .
4,376,955 3/1983 Reitmeier .
4,377,820 3/1983 Reitmeier .
4,381,519 4/1983 Wilkinson et al. .
4,464,674 9/1984 Schulz et al. .
4,464,686 9/1984 Reitmeier .
4,470,065 9/1984 Reitmeier .
4,485,399 11/1984 Schulz et al. .
4,490,748 12/1984 Kamath .
4,517,600 5/1985 Reitmeier ...................... 358/336 X
4,605,966 8/1986 Collins ............................. 358/160

*Primary Examiner*—Robert L. Richardson
*Attorney, Agent, or Firm*—George B. Almeida; Richard P. Lange

[57] ABSTRACT

An adaptive dropout compensator is fully digital and employs an adaptive logic circuit to detect dropout characteristics such as the extent thereof and the best available replacement data, and generates an adaptive logic decision for supplying the optimum replacement data. The circuit configuration lends itself to a switchable implementation for accommodating the various color television standards.

27 Claims, 7 Drawing Sheets

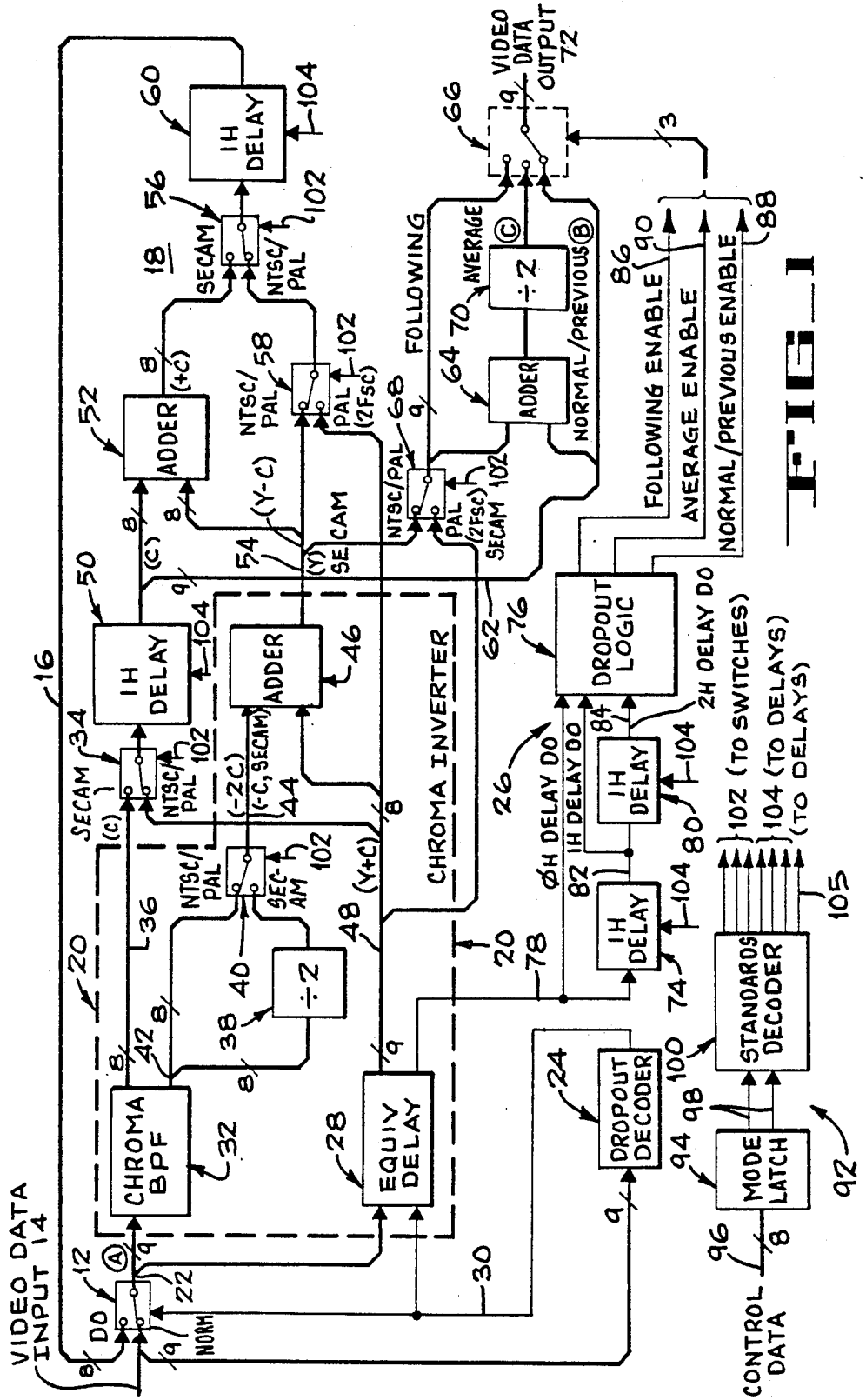
FIG_1

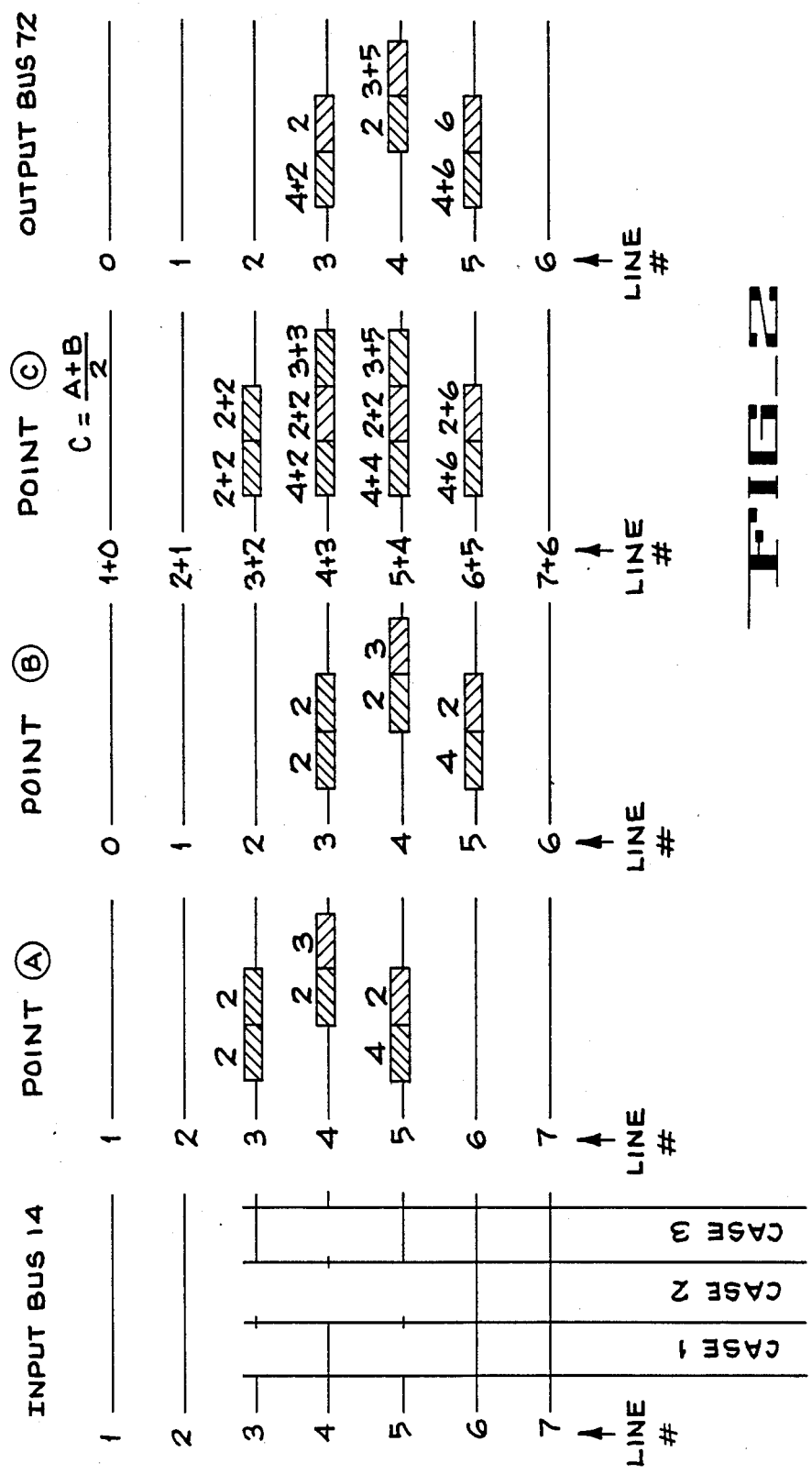
FIG_2

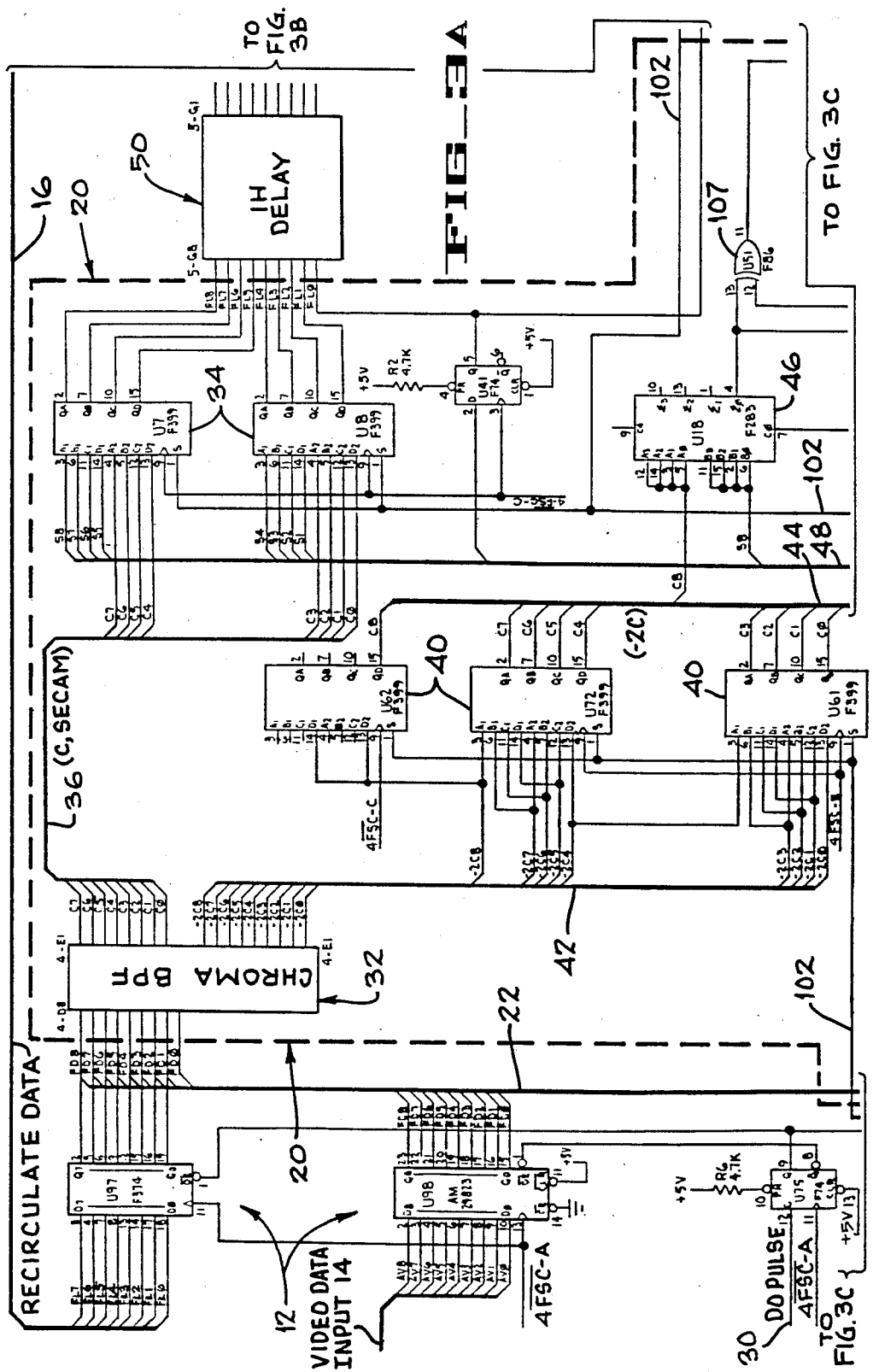

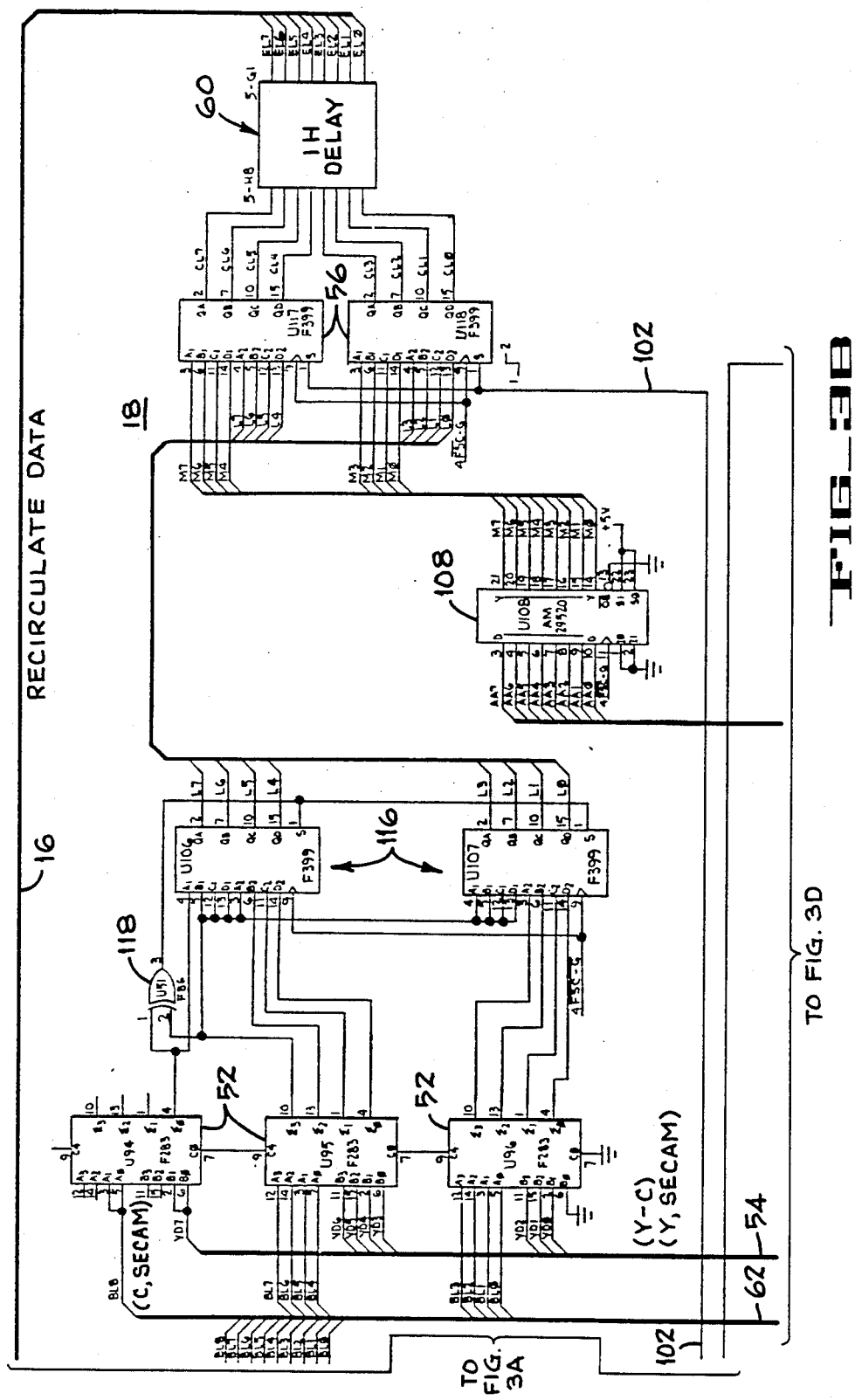

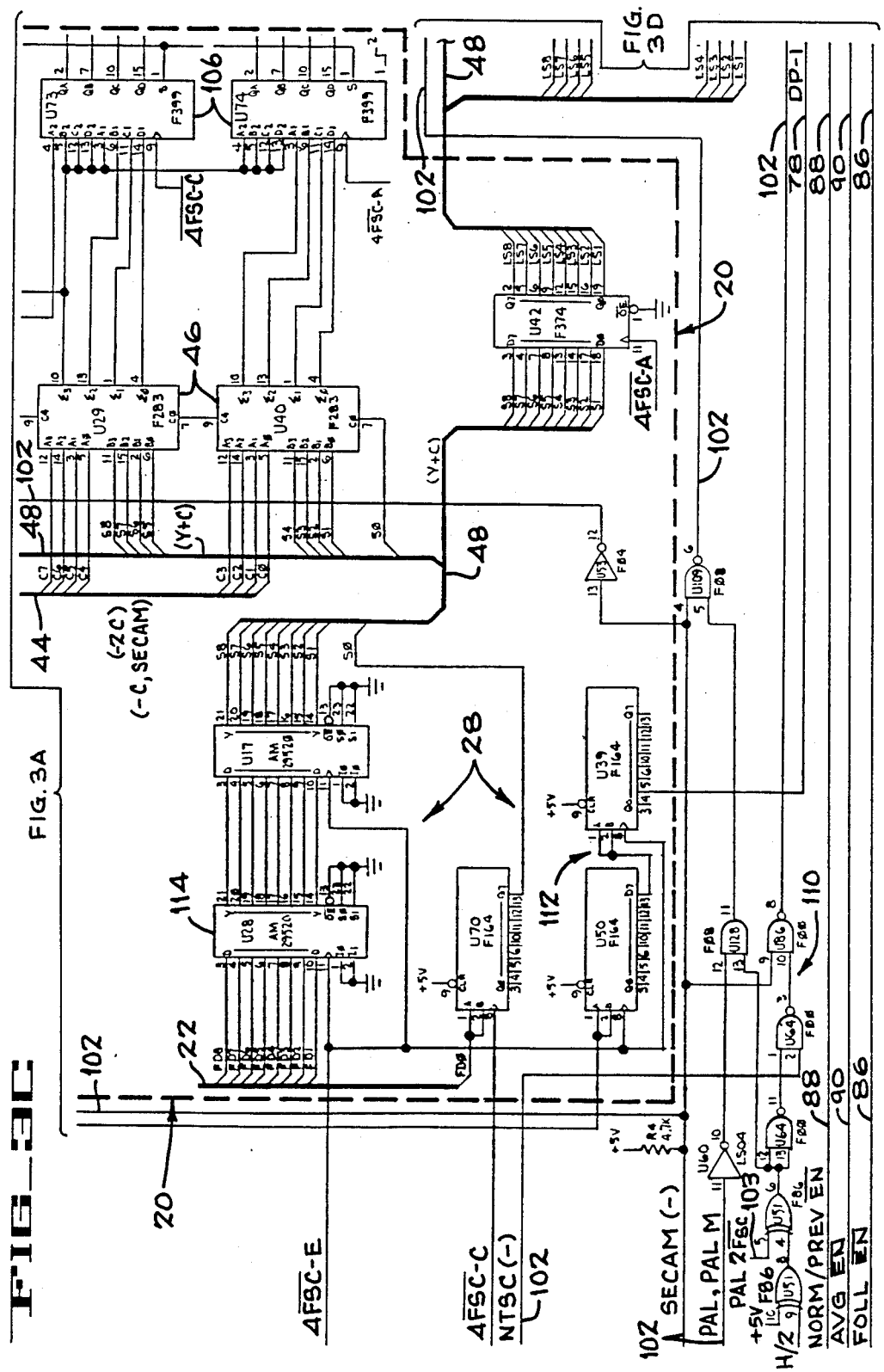

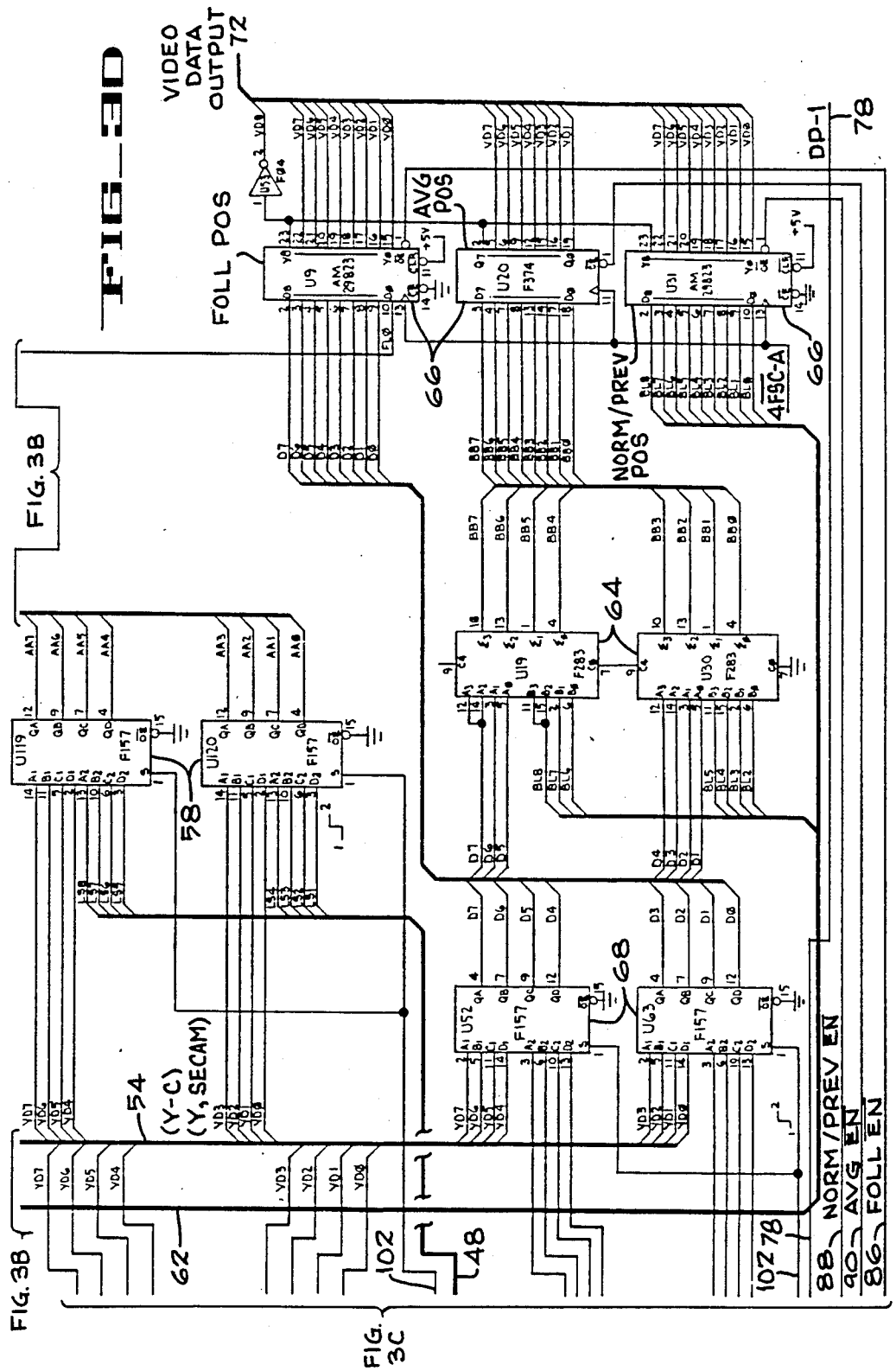

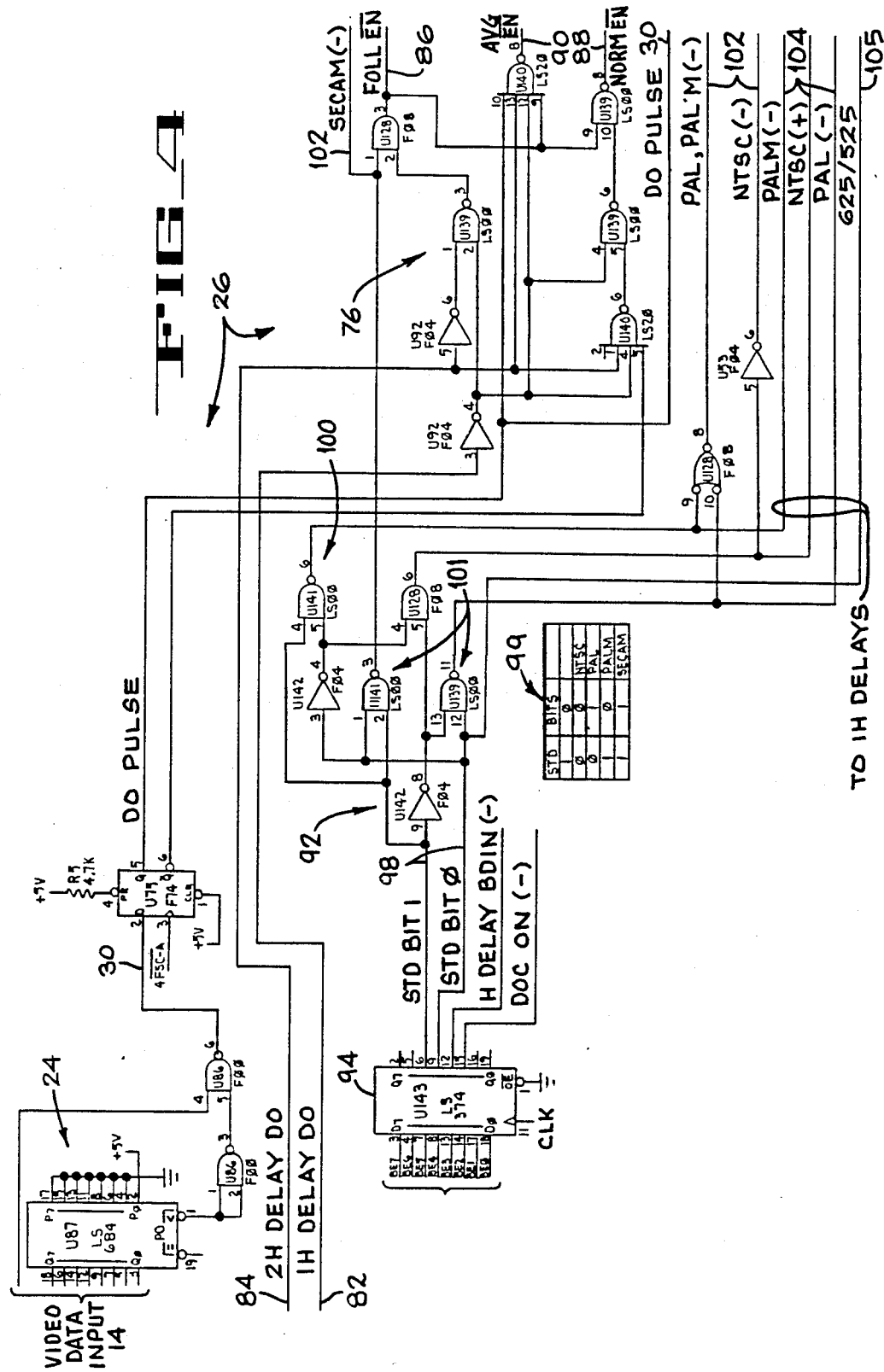

MULTI-STANDARD ADAPTIVE DROPOUT COMPENSATOR

BACKGROUND AND SUMMARY OF THE INVENTION

The invention relates to the replacement of missing video in a video signal and, more particularly to a digital dropout compensator with multiple color television standard capability, which selectively replaces missing video data with averaged data from a selected line or lines, or with recirculated data. The replacement data is selected in response to an adaptive decision generated by the location and characteristics of the missing video data.

As known in the art, defects in a television signal produce objectionable picture characteristics when the signal is reproduced as on a television screen. In broadcast television signals these defects arise from RF loss and impose noise on the signals which readily are visible in the television picture. These defects which arise from noise or loss of video RF are referred to in the art as "dropouts".

Since recorded television images corresponding to the television signal contain redundancy from line to line, it is possible to substitute segments or entire lines of the data from adjacent lines in place of the defective segments. To this end, early generations of dropout compensators (DOC) store image information from two lines previous and, when a dropout occurs, insert the previous line of information, or a portion thereof, into the video signal in place of the missing video. However, the process of replacing dropouts by previous line data or by any data is complicated by the characteristics of the signals in composite color television. As well known, in an NTSC color television standard, color television signals include a wideband luminance signal and a phase/amplitude modulated color subcarrier. The latter however, occurs with a 180° phase difference from line to line. This phase difference precludes direct signal substitution between adjacent lines when correcting dropouts because the substituted color information would be incorrectly reproduced. Since the above DOC derives the replacement video from two lines previous, the chroma is in proper phase. However, such video spatially is sufficiently distant from the dropout to have less redundancy whereby the replacement video is a less accurate estimate of the dropout-affected video.

A subsequent generation of DOC's attacked the color phase reversal problem while improving dropout replacement, by substituting a signal which is derived from multiple data samples of a previously stored line. The replacement data is derived by averaging the signal from two data points displaced from the dropout point by approximately $\pm\frac{1}{2}$ of the color subcarrier period. This provides a signal wherein the color subcarrier is in phase with an adjacent line, and the luminance signal approximates the average of the luminance signal over a color subcarrier period.

Still other DOC systems have been developed which produce a similar result by generating a replacement signal which is the average of four data points, two taken from a following image line and two from a previous image line relative to the image line currently being displayed. This latter DOC system of averaging four data points from adjacent lines, generally employs two serially connected 1H delay lines in combination with selected adders to provide the required delays and summations for performing the desired averaging of the four data points. In such a system, the signals first are variously delayed by one-half the color subcarrier period and/or by one color subcarrier period, as generally known in the art, to provide the desired data alignment prior to then summing the results. The summation is then divided by four to produce the replacement signal equal to the average of the four data points. Although this scheme of deriving replacement data from surrounding data points provides more accurate data, it cannot handle extended dropouts of greater than one line. In addition, the scheme requires added circuitry and cannot be adapted to multiple color television standards but has been used primarily either with the NTSC or the PAL standard.

An extension of the above system of averaging multiple surrounding data points employs a complex delay line system which is selectively tapped to provide the desired delays and subsequent additions to perform the averaging function. Such system employs a common delay element whereby all of the tapped signals undergo similar signal processing. In this latter averaging scheme utilizing the common delay element, the summed signal from the succeeding horizontal line may be attenuated with respect to the summed signal from the previous horizontal line, but the attenuation generally is compensated by including gain in the second adder circuit, thus simplifying the circuitry.

The two systems for averaging surrounding data points relative to a dropout in a middle line of a television signal, provide a more accurate replacement signal when compared to the system which merely replaces the dropout with corresponding information from the previous one or two lines. However, the averaging scheme generates noticeable distortion or blurring in pictures having sharp horizontal or angular edges, that is, where there is an intensity change in the vertical direction. To overcome the loss of resolution in the vertical direction, still another averaging scheme selectively records the video such that the originally adjacent samples are not adjacently recorded on the recording media. During reproduction, if a dropout occurs, the difference between samples in one direction with respect to the dropout sample is computed, and the difference between samples in at least one other direction with respect to the dropout sample also is computed. The signal with the least difference is used to control the direction of data from which the average is computed, which then is used as the replacement data for the dropout sample.

While the various averaging schemes improve the accuracy of replacement data, they are only useful in situations where the dropout is shorter in length then one line of the recorded signal. Such schemes cannot handle extended dropouts of greater than one line duration, which does occur in the field of data recording and reproducing. In addition, since such schemes provide the 1H delay lines prior to the function of chrominance signal inversion to compensate for the differences in chroma phase from line to line, such schemes have been utilized with signals in a single color television standard. That is, such averaging schemes are not readily adaptable to a switchable implementation capable of readily accommodating NTSC, PAL, and SECAM color television standards.

Nonetheless, it is highly desirable in this era of sophisticated, high speed, color television recorders, to provide an associated time base corrector device wherein the dropout compensator provides not only the most highly accurate replacement data for a dropout, but which is also readily switchable between the NTSC, PAL, and SECAM color television standards. To date there are no systems available which are fully digital, and can provide dropout compensation for multi-standard signal systems, while further providing the best possible replacement data for a particular dropout particularly in systems where data is being recorded at non-standard speeds.

The present invention provides a fully digital adaptive dropout compensator (DOC) which generates optimum dropout replacement data, and which further is capable of supplying the replacement data for all of the various color television standards, due to the selective arrangement of components forming the dropout compensator. The system is simpler in implementation than the dropout compensators of previous discussion, and provides more accurate replacement data by tailoring the replacement data source to the type of dropout. To this end, characteristics such as the extent of the dropout and the closest good data available, are detected and an adaptive decision is made, based on the characteristics, to supply replacement data from the most optimum adjacent data available. That is, the invention contemplates replacing dropouts from any of the various available data in selected adjacent lines in response to the adaptive decision. For example, if good video is available in adjacent lines the present adaptive DOC replaces a dropout either by averaging data from the previous line of data, from the following line of data, or by spatially averaging data from both the previous and the following adjacent lines. If video data from multiple adjacent lines is missing, the adaptive logic generates the decision to supply recirculated data from a previous line or lines as the replacement data. Thus the invention provides a multi-standard dropout compensator with multi-standard adaptive logic for detecting which available data source provides the most accurate replacement data for the specific dropout, and which then selects such preferred data to replace the dropout.

The advantageous accuracy, versatility and simplicity of the present adaptive DOC are derived through its improved configuration. To this end, in the absence of a dropout, a first input switch routes the video data through a small delay equivalent to the delay caused by a chroma inverter also in the DOC, and thence through a one-line delay, to derive the output of the dropout compensator. More particularly, the chroma inverter is located at the front of the present adaptive dropout compensator immediately behind the video input switch, with the one line delays located towards the end of the converter downstream of the chroma inverter. This allows the strategic insertion of various digital adders, standard switchers and an adaptive switch, as further described, which allows the use of the same digital circuit paths and thus the same digital circuit components in all standards of operation.

In the presence of a dropout, the adaptive logic of previous mention validates that the previous line and the following line of data are good, whereby the adaptive logic then selects a corresponding position of an adaptive output switch to provide replacement data derived by spatially averaging data from the previous and following lines. If the line previous or the line following have defective or missing data, the adaptive logic selects an adaptive output switch position which provides averaged replacement data from the other good line of data. If all three adjacent lines of data contain dropouts, then the adaptive logic selects a switch position which provides recirculated data from a previous line or lines to replace the dropout on the line currently being displayed.

The system further includes the standards switches of previous mention within the chroma inverter, within a recirculate data loop, and prior to the adaptive output switch, which switches cooperate within the adaptive DOC to provide switchability between the NTSC, PAL and SECAM color television standards in accordance with the invention combination.

BRIEF DESCRIPTION OF THE DRAWINGS

FIG. 1 is a block diagram of the adaptive dropout compensator of the invention combination.

FIG. 2 is a graph depicting the occurrence of dropouts, the available data in adjacent lines and the progress of the dropout replacement through the circuit of FIG. 1.

FIGS. 3A, 3B, 3C, 3D are a schematic diagram depicting an implementation of the video data path of the circuit of FIG. 1.

FIG. 4 is a schematic diagram depicting an implementation of the adaptive dropout logic means and the standards control means of the circuit of FIG. 1.

DESCRIPTION OF THE PREFERRED EMBODIMENTS

Referring to FIG. 1, a composite color video signal is supplied to a NORMAL position of an input switch 12 via a video data input bus 14, depicted herein as a 9-bit bus by way of example only. A second, DROPOUT position of input switch 12 is coupled to a recirculate data bus 16 (8-bit bus) of a recirculate data loop herein generally designated by numeral 18. The output of the switch 12 is coupled to a chroma inverter circuit 20 via a 9-bit bus 22.

The video data input bus 14 also is coupled to a dropout decoder circuit 24 of an adaptive dropout logic means 26 which provides an adaptive logic decision for selecting the data line or lines which supply the optimum dropout replacement data, as further described below. The dropout decoder circuit 24 supplies a dropout pulse which is indicative of the presence or absence of a dropout, to the video data input switch 12 as well as to an equivalent delay 28, via a dropout line 30.

The input switch 12 supplies the input video data to the equivalent delay 28 and to a chroma bandpass filter 32 via the bus 22 of previous mention. The delay 28 compensates for the delay caused in the chrominance signal path of the chroma bandpass filter 32, and also provides the same delay to the dropout pulse supplied via line 30. The bandpass filter 32 supplies 8-bit chrominance data to a SECAM position of a switch 34 via a bus 36, and 8-bit chrominance data to a divide-by-2 divider 38 as well as to a NTSC/PAL position of a switch 40, via a bus 42. The bandpass filter 32 may be any of various known digital filters of preferred quality and herein is a five tap digital bandpass filter. The output of the divider 38 is coupled to a SECAM position of the switch 40. The output of the switch 40 is coupled via an 8-bit bus 44 to one input of an adder 46, whose other input is coupled to the small delay 28 via a bus 48. The bus 48 also is coupled to a NTSC/PAL position of the switch 34.

The switch 34 is coupled to a one-line (1H) delay 50, and thence to one input of an adder 52. The output of the adder 46 is coupled to the second input of the adder 52 via an 8-bit bus 54, and the adder 52 is thence coupled to a SECAM position of another switch 56. The bus 54 also is coupled to a NTSC/PAL position of a switch 58, whose second, PAL position is coupled to the bus 48 from the equivalent delay 28. The output of switch 58 is coupled to a NTSC/PAL position of the switch 56. The output of switch 56 in turn is coupled to a second 1H delay 60 which is thence coupled back to the DROP-OUT position of the input switch 12 via the recirculate data bus 16. As may be seen, the switches 12, 34, 56, 58, the 1H delays 50, 60, the chroma inverter 20, the adder 52 and the bus 16 form various paths of the recirculate data loop 18, which provides various recirculated video data as determined by the presence of a dropout pulse on the dropout line 30, as well as by the particular color television standard selected via the commensurate positions of the various standards switches.

The output of the 1H delay 50 is supplied via a video data bus 62 to one input of an adder 64, and to a NORMAL/PREVIOUS position of a tri-state electronic adaptive switch 66. The bus 54 from the adder 46 is coupled to a NTSC/PAL position of a switch 68, whose other PAL/SECAM position is coupled to the bus 48 of the equivalent delay 28. The output of the switch 68 in turn is coupled to a second input of the adder 64 as well as to a FOLLOWING position of the adaptive switch 66. The output of the adder 64 is fed to a divide-by-2 divider 70, which in turn is coupled to an AVERAGE position of the adaptive switch 66. The adaptive switch 66 provides a video data output signal on a video data output bus 72, wherein the output signal may comprise following line video data, previous/normal line video data, or average video data derived by spatially averaging the following and previous line video data, depending upon the position of the adaptive switch 66. The term "spatially averaging" means that the replacement data for a dropout is spatially correct, that is, is interpolated data that is exactly in phase with the missing data.

The position of the adaptive switch 66 in turn is determined by the adaptive logic means 26 of previous mention in response to the presence of a dropout pulse on the dropout line 30. To this end, the equivalent delay 28 supplies the slightly delayed dropout pulse when present, to a first 1H delay 74 via a dropout line 78 and further depicts the dropout pulse coupled to an input of a dropout logic circuit 76. The output of the 1H delay 74 is a 1H delayed dropout pulse and is coupled to an 1H delay 80 and to an input of the dropout logic circuit 76, via a line 82. The output of the 1H delay 80 is a 2H delayed dropout pulse and is coupled to another input of the dropout logic circuit 76 via a line 84. The logic circuit 76 supplies selected adaptive decisions via respective enable lines 86, 88, 90. For example, the logic circuit 76 may supply a FOLLOWING ENABLE, a NORMAL/PREVIOUS ENABLE or an AVERAGE ENABLE logic decision, which is fed to the adaptive switch means 66 to select the corresponding switch position.

FIG. 1 depicts how the dropout pulse from the dropout decoder 24 is delayed by one line increments to remain in time with dropout data derived via the adaptive DOC. The truth table included below depicts the logic conditions corresponding to the delayed dropout pulse, which are supplied via the dropout logic circuit 76 on enable lines 86-90 coupled to the adaptive switch 66, to select the switch positions.

| 0H Line 78 | 1H Line 82 | 2H Line 84 | swit 66 pos'n |
|---|---|---|---|
| 0 | 0 | 0 | NORMAL/PREVIOUS |
| 0 | 0 | 1 | NORMAL/PREVIOUS |
| 0 | 1 | 0 | NORMAL/PREVIOUS |
| 0 | 1 | 1 | NORMAL/PREVIOUS |
| 1 | 0 | 0 | FOLLOWING |
| 1 | 0 | 1 | AVERAGE |
| 1 | 1 | 0 | NORMAL/PREVIOUS |
| 1 | 1 | 1 | NORMAL/PREVIOUS |

0 - Dropout
1 - No Dropout

The operation of the adaptive logic means 26 for selection of the positions of the adaptive switch 66, is further illustrated in FIG. 2 taken together with the truth table above. The logic tracks different points, herein labeled INPUT, A, B, C and OUTPUT, corresponding to the points shown along the circuit of FIG. 1. By way of example only, six different dropout cases are considered, herein termed cases 1 through 6, each of which is less than one line in length (10 microseconds, for example) and in each case there is a slightly different overlap between the dropout and data in adjacent lines. Data corresponding to each of the cases appears at the output data bus 72 one line later than the input data at the input data bus 14. Due to the different overlap conditions of this example, six different replacement data results are obtained via action of the adaptive logic means 26 and adaptive switch 66. Three of the results provide averaged line data signals, two of the results provide previous line data signals and one result provides a following data signal, at the output data bus 72. The graph is generally self-explanatory, wherein the lines from which replacement data are derived are identified by line numbers appearing above the crosshatched segments shown at points A, B, C and OUTPUT of the graph. A dropout is depicted in FIG. 2 by an empty space, that is, by an interruption in the line, with a pair of Econsecutive dropouts being shown in each of lines 3, 4 and 5, by way of example. The replacement data are depicted, at points A, B, C and output 72, by the consecutive crosshatched rectangles of lengths corresponding to the lengths of the respective dropout spaces.

More particularly, by way of example only, in case 1, line 3 has a first dropout as depicted by the space, and lines 2 and 4 have good data vertically adjacent as depicted by the continuous lines. Thus the replacement data for the first dropout in line 3, which appears at the output bus 72, is shown one line later and is derived by spatially averaging data samples from previous line 2 and following line 4 with the adaptive switch 66 in the AVERAGE position. In case 2, line 3 has a second dropout, line 2 has good data but line 4 also has a dropout. Thus the replacement data for the second dropout in line 3, at the output bus 72, appears one line later and is derived from the previous line 2, with the adaptive switch 66 in the NORMAL/PREVIOUS position. In case 3, line 4 has a first dropout, while both lines 3 and 5 also have dropouts in vertically adjacent locations. Thus the replacement data for the first dropout in line 4, which appears at the output bus 72, appears one line later and is derived from recirculated data taken from line 2 and stored in the recirculate data loop 18. The adaptive switch 66 is in the NORMAL/PREVIOUS position. In case 4, line 5 has a second dropout, lines 3 and 4 have dropouts vertically adjacent, but line 6 has good data. Thus the replacement data for the second dropout in line 5, that appears at the output bus 72, is derived from the following line 6 with the adaptive switch in the FOLLOWING position. In case 5, line 5 has a first dropout, and in case 6, line 4 has a second dropout. Both dropouts have good data in respective lines vertically adjacent, and in both cases 5 and 6, replacement data is taken from the vertically adjacent lines with the switch 66 in the AVERAGE position.

Accordingly, it may be seen that the adaptive logic means 26 detects the availability of good data in the vertically adjacent lines relative to a dropout and, based on the closest good data available, generates an adaptive decision corresponding to the best available replacement data as reflected in the truth table above. The decision then selects the corresponding position in the adaptive switch 66 via the enable lines 86–90. If extended dropouts greater than one line are experienced, then the adaptive switch 66 supplies recirculated data as the replacement data via the NORMAL/PREVIOUS position, as previously discussed.

As may be seen, FIGS. 3A,3B,3C, 3D illustrate an implementation of the video data processing circuitry of FIG. 1 wherein like components also are similarly numbered and readily identified by comparison with the block diagram of FIG. 1. Likewise, FIG. 4 illustrates an implementation of the adaptive logic means 26 and the standards control means 92 of FIG. 1, wherein like components are similarly numbered.

Referring to FIGS. 3,4 as well as FIG. 1, the operation of the adaptive dropout compensator generally is described herein for an NTSC color television standard wherein accordingly, the standards switches 34, 40, 56, 58 and 68 are placed in the NTSC/PAL position. The standard used is selected by means of a standards control means 92 illustrated in FIGS. 1 and 4 as a latch 94 for receiving control data via an 8-bit bus 96. The control data is in the form of 8-bit digital words supplied by system control (not shown) and determined, for example, by microprocessor input corresponding to the desired standard. The latch 94 supplies a pair of standard bits via lines 98 to a standards decoder 100. The decoder 100 includes a plurality of logic gates 101 (FIG. 4) for generating a corresponding logic level on each of various standards control lines 102, which select the positions of the various switches 34, 40, 56, 58 and 68 to select the desired standard. The standards decoder 100 also supplies a second set of logic levels corresponding to the respective color standards to respective 1H delays 50, 60, 74, and 80 via control lines 104. A line 105 also supplies a logic level corresponding to a 525 or 625 line scan raster which is fed to the various 1H delays 50, 60, 74, 80 to implement the corresponding raster. A truth table 99 (FIG. 4) shown near the decoder 100 explains the binary logic supplied via lines 98 and thus the logic decisions supplied via the control lines 102, 104, 105.

In the NTSC standard, the normal data signal or the recirculated data is routed to the chroma inverter circuit 20, whereby the chrominance signal ($-2C$) is selected via the switch 40 and is applied to the adder 46 together with the normal data signal ($Y+C$) on the bus 48 from the equivalent delay 28. The resultant summed signal ($Y-C$) is re-clocked by a register 106 (FIG. 3C) and an exclusive OR-gate 107, (FIG. 3A), which together function as an overload detector using 2's complement arithmetic and with a selector to set the value equal to the maximum or minimum 2's complement value; where 7F equals maximum and 80 equals minimum. The register 106 produces the signal ($Y-C$) on bus 54. After chroma inversion, the signal is routed through the switch 58, a short delay 108 and thence to the switch 56. The short delay 108 includes a register which allows the signal to be re-clocked. The signal is recirculated back to the input data switch 12 via the 1H delay 60, and thus is available as recirculated data with 1H delay.

A re-clocking overload detector 116 (FIG. 3B) is coupled to the adder 52 and uses 2's complement arithmetic with an exclusive OR-gate 118 to detect the overload as described for detector 106.

The chroma inverter circuit 20 also routes the recirculated data or the normal video data to the 1H delay 50 and thence to the NORMAL/PREVIOUS position of the adaptive switch 66 via the bus 62. The adder 46 supplies the chrominance inverted signal ($Y-C$) to the FOLLOWING position of the adaptive switch 66 via the bus 54 and switch 68. Spatial averaging is done via the adder 64 which sums chrominance inverted previous line data and following line data and divides by two at the input thereof by bit shifting. The spatially averaged data appears at the AVERAGE position of the adaptive switch 66.

In normal NTSC operation, when there is no dropout, the input data switch 12 is placed in the NORMAL position by the logic level on dropout line 30 (FIGS. 1,3A), whereby the input video data on bus 14 is fed through the equivalent delay 28 and 1H delay 50, to the adaptive switch 66. Since there is no dropout, the adaptive logic means 26 supplies the NORMAL/PREVIOUS ENABLE logic decision via the line 88 to place the adaptive switch in the NORMAL/PREVIOUS position. Thus, the input video data appears on the video data output bus 72 one line after it is fed to the input bus 14. Simultaneously, the good line of data also is fed to the 1H delay 60 via the chroma inverter 20 and thus is stored in the recirculate data loop 18 with inverted chrominance.

In the event of a dropout, for example in the next line of data, the input data switch 12 is placed in the DROPOUT position via the dropout pulse on dropout line 30. The output of switch 12, i.e., bus 22, has good recirculated data from the previous line, which data further has the correct chrominance phase and thus is available for use at the output of the adaptive dropout compensator. The phase is correct because of the presence of the chroma inverter in the recirculate data path, which passes the luminance signal (Y) and inverts the chrominance signal ($Y-C$) which is alternating in phase on each line in NTSC. Since the normal delay from input to output of the compensator is one line, during a dropout the adaptive switch 66 may select the recirculated data from two lines previous (since there is a one line delay 50 from input to output and a one line delay 60 in the recirculate data path) or, may select the chrominance inverted following line of data at the data bus 22 which has no delay and therefore is one line in advance of the normal data signal. In addition, the adaptive logic means 26 (FIG. 4) may select the AVERAGE position on the adaptive switch 66 to thereby supply the average data signal derived by spatially averaging the following and previous data signals. Thus, the adaptive logic means 26 determines the best possible data available to replace the dropout and selects the corresponding position on the adaptive switch 66 in response to the corresponding FOLLOWING ENABLE, NORMAL/PREVIOUS ENABLE or AVERAGE ENABLE logic decisions supplied by the adaptive logic means 26 via respective enable lines 86, 88 or 90.

As further shown in FIG. 4, the dropout pulse is detected in the dropout decoder circuit 24 which supplies the corresponding logic level to the input data switch 12 via line 30, and to a shift register 112 of the equivalent delay 28 (FIG. 3C). The dropout pulse then is fed to the dropout logic circuit 76 (FIGS. 1,4) and to 1H delays 74, 80 of FIG. 1 to provide the adaptive logic decisions.

In a PAL system, the present adaptive DOC operates essentially as described above for a NTSC system with the selection of the NTSC/PAL position on switches 34, 40 and 56, and with switches 58, 68 toggling between the PAL positions, as directed by the standards control means 92 (FIGS. 1,4). To process PAL signals, the adaptive dropout compensator uses a technique generally known in the art as "PAL modifier", to first convert the PAL (or PAL-M) signal. The PAL modifier technique is based on the signal characteristics of the PAL system, wherein the V axis of U and V chrominance samples phase alternate from line to line, with the subcarrier advancing by 90 degrees each line and with 4Fsc sampling on the burst zero degree phase crossing axis. Since the 4Fsc sampling phase aligns with burst zero phase crossing it is shifted 45 degrees from the U and V axes, whereby each 4Fsc sample contains U and V information. Thus chrominance samples will have identical, or opposite, phase from one line to the next depending on the 2Fsc period. The true 2Fsc clock appears as an odd number of cycles per horizontal line and alternates in phase from line to line. Thus any line of data can be derived from any previous line of data by inverting the chrominance phase of the sample on the previous line whenever the 2Fsc clock is detected as a high logic level, and by not inverting the phase when the 2Fsc clock is detected as low.

It follows that phase inversion is provided by toggling the switches 58 and 68 (FIGS. 1 and 3D) between their PAL positions at a 2Fsc rate via the respective line 102 when in a PAL or PAL-M standard. The 2Fsc clock is supplied via a line 103 (FIG. 3C) and a plurality of inverting gates 110 which also receive the NTSC, PAL and SECAM logic from the standards decoder circuit 100 and a H/2 system timing signal. Luminance (Y) remains the same on either side of the switches but the chrominance phase inverts from (+C) to (−C). Thus, the switches 58, 68 provide the luminance and alternating chrominance signals from the signals (Y−C) on bus 54 and (Y+C) on the bus 48. The 1H delays 50 and 60 herein are clocked at 2 Fsc and are multiplexed into two parallel paths to reduce the speed at which their memories (not shown) have to operate. Because there is an even number of 2 Fsc cycles per line in NTSC and an odd number of cycles in PAL, an odd-/even trim of one 4 Fsc cycle is placed in each of the 1H delay paths via the short delay 108 (FIG. 3B) and a short delay 114 in the equivalent delay 28 (FIG. 3C). The short delays are multiplexer/ registers with four 8-bit data latches arranged in series to select outputs of from one to four small delays. In all other respects the video and chrominance paths and the operation of the present adaptive dropout compensator corresponds to when operating in the NTSC standard.

In the SECAM standard, the standards control means 92 directs the switches 34, 40, 56 and 68 to the SECAM positions, whereby missing data is replaced by a whole line of recirculated data from the recirculate data loop 18, rather than by partial line replacement. This is required in SECAM since its frequency modulated chrominance signal cannot be interrupted during a data line, and thus the decoded dropout signal is formed in continuous line blocks. In the absence of a dropout, the normal signal path is via the NORMAL position of the input data switch 12, the equivalent delay 28, the switch 68 and the FOLLOWING position of the adaptive switch 66. During a dropout, video data is recirculated with one line of delay for the luminance signal and two lines of delay for the chrominance signal to provide proper chrominance line type. This is necessary, since there are two line types in the SECAM standard, one with R−Y encoded FM and one with B−Y encoded FM, which alternate every other line, as is generally known in the art.

To this end, to separate chrominance and luminance, the bandpass filter 32 provides a chrominance signal on bus 36 and an inverted chrominance signal on bus 44. The non-inverted chrominance signal (C) is delayed one line by 1H delay 50, while the inverted chrominance signal (−C) is subtracted from the composite video signal (Y+C) via the adder 46 to obtain the luminance signal (Y) on bus 54. The luminance signal (Y) and the 1H delayed chrominance signal (C) are added together via the adder 52, and the composite video signal (Y+C) is supplied back to the DROPOUT position of the input data switch 12 via the switch 56, the 1H delay 60 and the recirculate data bus 16. More particularly, chrominance data is routed to the 1H delay 50 by enabling the switch 34 with SECAM(+) from the respective line 102 of the standards decoder means 100. The output from delay 50 carries delayed chrominance which is added to luminance in adder 52. The re-clocking overload detector 116 of previous mention (FIG. 3B) is coupled to the adder 52 and supplies the composite video signal (Y+C) to the 1H delay 60.

The SECAM data signal of 1H delayed luminance and 2H delayed chrominance is supplied via data bus 48 and switch 68 to the FOLLOWING position of the adaptive switch 66, as directed by the adaptive logic means 26.

Nominal delay through the present adaptive DOC is one line in NTSC and PAL systems, but only a few clock cycles in SECAM. All functions in the system operate at 4 Fsc and use 2's complement arithmetic. To convert 2's complement at the input, the most significant bit (MSB) of the input video data is inverted prior to the input data switch 12. To convert back to unsigned binary numbers at the output of the adaptive DOC, the MSB at the output bus 72 is inverted. The latter configuration is further shown in the FIG. 3D. Although 9-bit resolution is maintained through the compensator for normal signal data, only the eight MSB's are used for dropout data.

The dropout compensation is performed in digital form on video data which has previously been time base corrected. The dropouts are identified by a binary word consisting of, for example, all zero bits which are previously inserted in the video data stream and which thus are supplied to the dropout decoder circuit 24 via input video bus 14 (FIG. 4). The all-zero word is detected and then replaced with the correctly phased digital replacement data by the present adaptive DOC. Since any time base errors have been removed and since chroma inversion is provided prior to the 1H delays 50, 60, the DOC is adapted to dropout compensation in all standards, as well as in all modes of operation, including slow motion and shuttle speeds, via the corresponding selection of the standards switches positions, as previously discussed.

Although the present adaptive DOC generally has been described relative to missing data in video recovered from a recording media such as magnetic tape, it may be used for correcting impairments in any signal wherein the impairments can be detected, and wherein there is a certain redundancy in the signal content.

What is claimed is:

1. A circuit for replacing dropouts in a video signal with replacement data derived from previous data, following data or recirculated data of the video signal, comprising:
    adaptive logic means responsive to the extent and location of a dropout, for determining the best available replacement data;
    delay means responsive to the dropout for providing selected delay dropout signals indicative of the relationship of the dropout and the previous and following data;
    said adaptive logic means including dropout logic means responsive to said selected delay dropout signals, for generating selected adaptive enable decisions corresponding to each of the replacement data; and
    switch means responsive to the dropout logic means for selecting the best available replacement data from the previous data, the following data, a spatial average of the previous and following data or from the recirculate data, commensurate with the extent and location of the dropout.

2. The circuit of claim 1 wherein the dropout logic means includes:
    gate means responsive to the delay dropout signals, for generating binary words indicative of respective following data enable, previous data enable and average data enable adaptive decisions.

3. The circuit of claim 2 further including:
    means for detecting a dropout;
    wherein said delay dropout signals comprise previous, present and following dropout signals; and
    wherein the gate means simultaneously responds to the previous, present and following delay dropout signals.

4. The circuit of claim 2 wherein the video with the dropout has good previous and following video data vertically adjacent thereto; and
    said gate means generates the binary word indicative of the average data enable adaptive decision to direct the switch means to select the spatial average of the previous and following video data.

5. The circuit of claim 2 wherein the video with the dropout has good previous video data and a dropout on the following video data vertically adjacent; and
    said gate means generates the binary word indicative of the previous data enable adaptive decision to direct the switch means to select the previous video data.

6. The circuit of claim 2 wherein the video with the dropout has good following video data and a dropout on the previous video data vertically adjacent; and
    said gate means generates the binary word indicative of the following data enable adaptive decision to direct the switch means to select the following video data.

7. The circuit of claim 2 wherein the video with the dropout has further dropouts on the previous and following video data vertically adjacent; and
    said gate means generates the binary word indicative of the previous data enable adaptive decision to direct the switch means to select the recirculated video data.

8. A circuit for compensating for dropouts in successive lines of a video signal by replacing them with data from a previous line, a following line, an average of the data from the previous and following lines, or a recirculate data path, wherein the circuit is switchable between conventional color television standards, comprising:
    video signal processing means receiving the video signal commensurate with a selected one of said color television standards, for generating the previous line data, the following line data, a spatial average of the previous and following line data, and the recirculate data, where each of the data have a chrominance component which is phase coherent with the video signal which is missing because of the dropout;
    adaptive dropout logic means responsive to the occurrence of a dropout and its relationship to vertically located data in adjacent lines, for generating logic decisions commensurate therewith; and
    adaptive switch means integral with the video signal processing means for adaptively passing the previous, the following, the spatial average or the recirculate line data in response to the logic decisions from the adaptive dropout logic means.

9. The circuit of claim 8 further including:
    standards control means for supplying control signals indicative of the selected one of said color television standards to the video signal processing means; and
    standards switch means operable with the video signal processing means for selecting the desired standard in response to the standards control means.

10. The circuit of claim 9 wherein the video signal processing means includes:
    chroma inverter means for receiving the video signal and for generating a luminance signal and an inverted chrominance signal;
    said standards switch means being operatively switchable relative to the chroma inverter means for selecting the desired color television standard in response to the standards control means; and
    delay means operatively coupled from the standards switch means to the adaptive switch means for supplying selected 1H delays in response to the standards control means.

11. The circuit of claim 9 wherein the adaptive dropout logic means includes:
    dropout decoding means for indicating the presence of a dropout in the video signal;
    dropout delay means coupled to the dropout decoding means for simultaneously providing delay dropout signals indicative of the dropout and of the previous and following line data relative to the dropout; and
    logic gates coupled to the dropout delay means for generating the logic decisions in response to the delay dropout signals.

12. The circuit of claim 9 wherein the standards control means includes:
    means for supplying a standard selecting digital control signal;

latch means for providing binary words commensurate with respective standards in response to the digital control signal; and a standards decoder coupled to the latch means for generating the standard selecting digital control signal in response to the binary words.

13. A circuit for compensating for dropouts in successive lines of a video signal by replacing them with video from selected adjacent lines of video, comprising:

chroma inverter means for receiving the video signal and for generating a normal video signal and an inverted chrominance signal;

means coupled to the chroma inverter means for providing a 1H delayed video signal;

recirculate data loop means operatively coupled to the chroma inverter means for supplying a delayed recirculate video signal back to the input of the chroma inverter means;

averaging means coupled to the chroma inverter means for spatially averaging the normal video signal and the following video signal;

adaptive dropout logic means for generating an adaptive decision in response to the presence of a dropout in the video signal; and adaptive switch means coupled to the chroma inverter means and to the averaging means for selectively passing video from one of the latter means in response to the adaptive dropout logic means.

14. The circuit of claim 13 wherein the adaptive dropout logic means includes:

means for supplying a 0H delayed dropout pulse signal in the presence of a dropout;

dropout delay means coupled to the dropout pulse signal supplying means for providing 1H delayed and 2H delayed dropout pulse signals; and dropout logic gate means responsive to the 0H, 1H and 2H delayed dropout pulse signals for generating a data enable adaptive decision commensurate with the dropout pulse signals relationship.

15. The circuit of claim 13 wherein the adaptive switch means includes:

multiple input positions for receiving the following video signal, the normal video signal and the spatially averaged video signal respectively; and said adaptive switch means being responsive to the adaptive decisions from the adaptive dropout logic means.

16. The circuit of claim 13 further including:

standards control means for generating a control signal indicative of a color television standard; and standards switch means integral with the chroma inverter means, the recirculate data loop means and the averaging means for selecting the desired standard in response to the control signal from the standards control means.

17. A circuit for compensating for dropouts in successive lines of a video signal recovered from a recording media, comprising:

adaptive logic means responsive to the occurrence of a dropout for providing a dropout pulse indicative of the extent and location of the dropout;

first means for receiving the video signal and for generating recirculated data corresponding to a previous line of video;

second means for receiving the video signal and for generating video data corresponding to a following line of video;

third means for generating spatially averaged data from the previous line and the following line;

wherein the data generated by the first, second and third means contains a chrominance component which is phase coherent with the video signal of the dropout; and adaptive switch means selectively coupled to the first, second or third means, for selecting the previous line data, the following line data or the spatially averaged data respectively, in response to the adaptive logic means.

18. The circuit of claim 17 wherein the multiple means for generating data include:

chroma inverter means for receiving the video signal; and a recirculate data loop coupled to the chroma inverter means for supplying to the latter means 1H delayed recirculated data.

19. The circuit of claim 18 further including:

standards control means for generating a control signal indicative of a NTSC, a PAL or a SECAM color television standard; and standards switch means operatively coupled with the chroma inverter means and the recirculate data loop for selecting one of the standards in response to the standards control means control signal.

20. A circuit for compensating the dropouts in a video signal, comprising:

a chroma inverter for receiving the video signal;

first 1H delay means coupled to the chroma inverter;

first switch means operatively coupled to the chroma inverter and to the first 1H delay means;

second 1H delay means defining a recirculate data loop coupled from the first switch means back to the chroma inverter;

second switch means coupled to the chroma inverter;

adaptive logic means receiving the dropouts for generating an adaptive logic decision in the presence of a dropout; and adaptive switch means coupled to the chroma inverter, to the second switch means and to the first 1H delay means and responsive to the adaptive logic means.

21. The circuit of claim 20 further including:

third switch means coupling the chroma inverter to the first switch means; and standards control means for supplying a switch position control signal to the first, second and third switch means.

22. The circuit of claim 21 further including:

data averaging means coupled to the first 1H delay means and to the second switch means for supplying spatially averaged data to the adaptive switch means.

23. The circuit of claim 21 wherein the adaptive logic means includes:

dropout means for generating a 0H delayed, a 1H delayed and a 2H delayed dropout signal; and a dropout logic circuit coupled to the dropout means for supplying the adaptive logic decision to the adaptive switch means.

24. A method for replacing dropouts in a video signal with replacement data derived from previous data, following data or recirculated data of the video signal, the method being compatible with a selected one of conventional color television standards, comprising:

determining the extent and location of a dropout and the best available replacement data;

providing previous line data, following line data, spatially averaged data from the previous and following line data and recirculated data from the video signal, wherein the data are provided having a chrominance component which is phase coherent with the video signal which is missing because of the dropout;

generating selected adaptive enable decisions corresponding to each of the replacement data; and selecting the best available replacement data from the previous line data, the following line data, the spatially averaged data of the previous and following line data; or the recirculated data, commensurate with the extent and location of the dropout.

25. The method of claim 24 including:

supplying control signals in the form of binary words indicative of the selected one of said conventional color television standards; and selecting said one of said conventional color television standards in response to supplying the binary word control signals.

26. The method of claim 25 wherein the step of generating includes:

generating binary words indicative of the respective adaptive enable decisions for selecting the following line data, the previous line data, the spatially averaged data or the recirculated data.

27. The method of claim 25 wherein the step of determining includes:

supplying selected delay dropout signals indicative of the relationship of the dropout and the previous and following line data; and simultaneously monitoring the delay dropout signals to detect the occurrence of a dropout and its relationship to vertically located data in adjacent lines of the respective video.

* * * * *